(12) United States Patent
Kettemer et al.

(10) Patent No.: US 11,204,600 B2
(45) Date of Patent: Dec. 21, 2021

(54) DATA INTERFACE DEVICE FOR USE ON A NUMERICALLY CONTROLLED MACHINE TOOL

(71) Applicant: DECKEL MAHO PFRONTEN GMBH, Pfronten (DE)

(72) Inventors: Rolf Kettemer, Marktoberdorf (DE); Alexander Holzner, Mühlheim an der Ruhr (DE); Gerhard Rausch, Rheda-Wiedenbrück (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 85 days.

(21) Appl. No.: 16/486,054

(22) PCT Filed: Feb. 14, 2018

(86) PCT No.: PCT/EP2018/053687
§ 371 (c)(1),
(2) Date: Aug. 14, 2019

(87) PCT Pub. No.: WO2018/149879
PCT Pub. Date: Aug. 23, 2018

(65) Prior Publication Data
US 2020/0057430 A1    Feb. 20, 2020

(30) Foreign Application Priority Data

Feb. 14, 2017    (DE) ..................... 10 2017 202 360.0

(51) Int. Cl.
*G05B 19/418*    (2006.01)

(52) U.S. Cl.
CPC ............... *G05B 19/4185* (2013.01); *G05B 2219/31124* (2013.01); *G05B 2219/31177* (2013.01); *G05B 2219/50291* (2013.01)

(58) Field of Classification Search
CPC ...... G05B 19/4185; G05B 2219/31124; G05B 2219/31177; G05B 2219/50291; G05B 19/414; Y02P 90/80; Y02P 90/02
See application file for complete search history.

(56) References Cited

U.S. PATENT DOCUMENTS

2003/0229414 A1* 12/2003 Nakazawa ........... G05B 19/408
                                                            700/175
2004/0193307 A1* 9/2004 Fujishima .......... G05B 19/4065
                                                            700/177

(Continued)

FOREIGN PATENT DOCUMENTS

DE    10 2008 061 721 A1    6/2010
JP    H05-20332 A    1/1993

(Continued)

OTHER PUBLICATIONS

Apr. 26, 2018 International Search Report issued in International Patent Application No. PCT/EP2018/053687.

(Continued)

*Primary Examiner* — Mohammad Ali
*Assistant Examiner* — Sheela Rao
(74) *Attorney, Agent, or Firm* — Oliff PLC

(57) ABSTRACT

A data interface device for data transmission between a numerically controlled machine tool and external data processing device, including: a control interface unit for data transmission with a control device of the machine tool and communications unit for data transmission with the external data processing device. Stored configuration data specifies a communication protocol used by the control device from a first group of communication protocols and a communication protocol used by the external data processing device from a second group. The control interface unit uses any protocol from the first group of communication protocols for data transmission and selects the communication protocol (Continued)

used by the control device for data transmission with the control device. The communications unit uses any protocol from a second group of communication protocols for data transmission and selects the communication protocol used by the external data processing device for data transmission with the data processing device.

20 Claims, 2 Drawing Sheets

(56) References Cited

U.S. PATENT DOCUMENTS

| | | | |
|---|---|---|---|
| 2007/0150235 A1* | 6/2007 | Lev-Ami | G05B 23/0221 |
| | | | 702/182 |
| 2009/0043415 A1 | 2/2009 | Sun et al. | |
| 2009/0106345 A1 | 4/2009 | Landgraf et al. | |
| 2012/0002949 A1* | 1/2012 | Matsuura | H04N 9/8715 |
| | | | 386/248 |
| 2016/0179085 A1* | 6/2016 | Seitz | G05B 19/414 |
| | | | 700/180 |

FOREIGN PATENT DOCUMENTS

| | | |
|---|---|---|
| JP | 2004-13665 A | 1/2004 |
| JP | 2004-295348 A | 10/2004 |
| JP | 2009-505277 A | 2/2009 |
| JP | 2016-527637 A | 9/2016 |
| WO | 2007/049704 A1 | 5/2007 |
| WO | 2010/106795 A1 | 9/2010 |

OTHER PUBLICATIONS

Nov. 7, 2018 Office Action issued in German Patent Application No. 10 2017 202 360.0.
Jun. 16, 2021 Office Action issued in Japanese Patent Application No. 2019-543754.

* cited by examiner

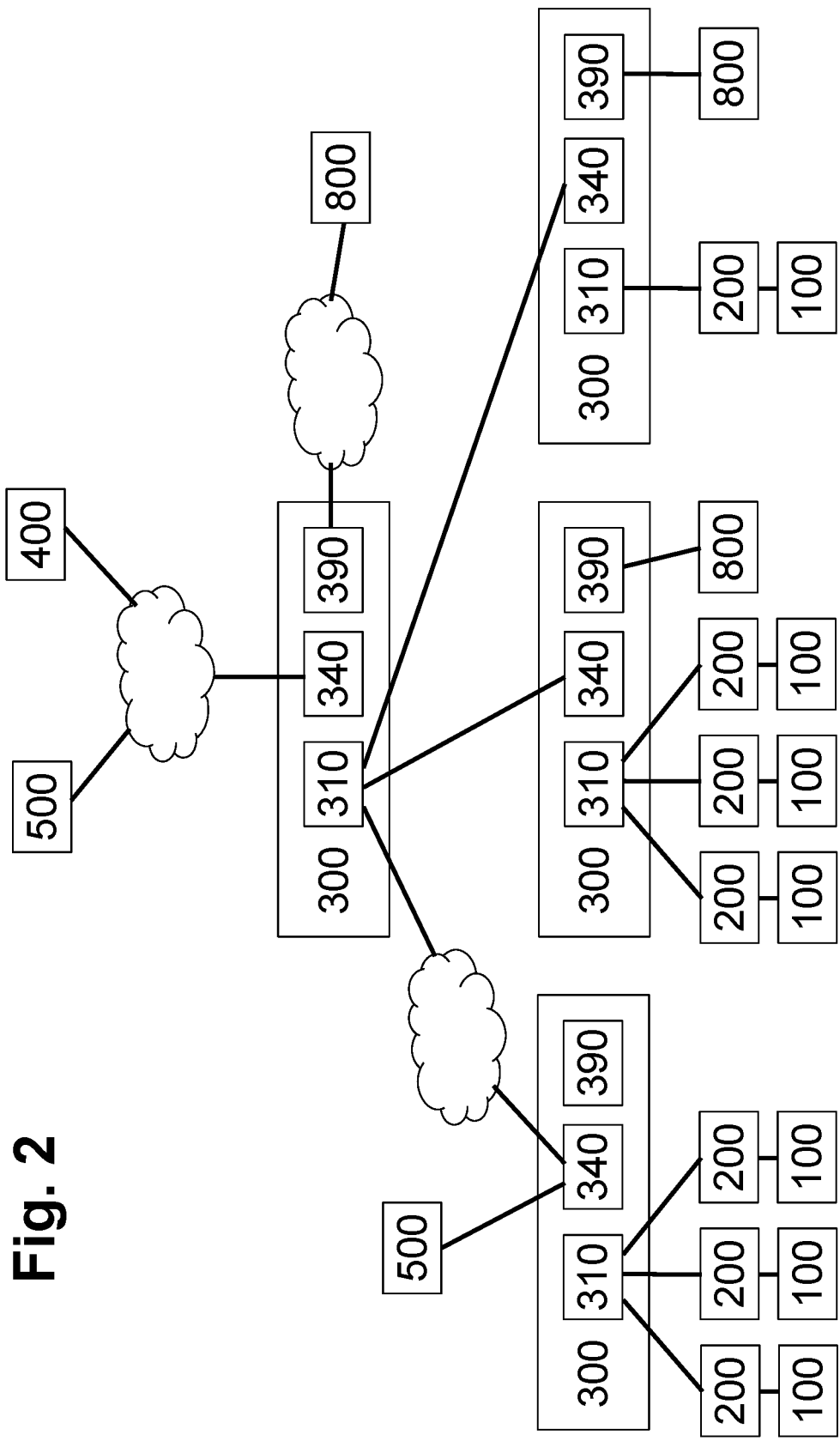

DATA INTERFACE DEVICE FOR USE ON A NUMERICALLY CONTROLLED MACHINE TOOL

The present invention relates to a data interface device for data transmission between a numerically controlled machine tool and an external data processing device, in particular for transmission of machine tool data between one or more numerically controlled machine tools and one or more external data processing devices (e.g. a computer, server or computer or server network).

BACKGROUND

In the prior art, numerically controlled machine tools are known, each comprising a control device for controlling a plurality of actuators of the machine tool and a plurality of sensors for outputting sensor signals to the control device relating to a machine status of the machine tool.

For the evaluation, display or monitoring of a machine status of the machine tool during operation or during the machining of workpieces on the machine tool, it is known that processor-controlled memory units (so-called "data loggers") are provided in the control unit of the machine tool or on the control unit of the machine tool which store all available sensor signals of the sensors of the machine tool in individual channels at the same sampling frequency or readout frequency in one storage medium, the sampling frequency or readout frequency, however, being dependent on the type-dependent possibilities of the control device (NC control and/or PLC or SPS) of the machine tool.

Therefore, by means of the data loggers known from the prior art for various machine tools, an unfiltered and unadapted flood of pure sensor value data from all available sensors is stored, which are both machine tool dependent and control dependent.

On the one hand, this leads to large and confusingly collected amounts of data and, on the other hand, makes it particularly difficult to evaluate or display the collected data in a manner that is independent of machine tools and/or control.

In addition, it is known that controls (NC/PLC) for machine tools are provided by different manufacturers and each has different, partly proprietary, data interfaces. For this purpose, the machine tool controls most commonly provide a communication protocol for reading out data from the control or receiving data from the control to external data processing devices. Such communication protocols supported by the machine controls are partly very divergent and generally cannot be combined or integrated. Known controls fall back on known systems, e.g. UDI-, RFC- or OPC-based systems, however, controls of some control manufacturers use individual proprietary communication protocols.

This makes it difficult to provide a uniform data transmission from several machine tools, with controls from different manufacturers, to external data processing devices in a uniform way, e.g. to read and process machine status data of several machine tools from different manufacturers or with controls from different control manufacturers or to monitor the machine status of the machine tools in a uniform and simple way.

It is also known in this context that universal communication protocols (so-called machine-to-machine communication protocols or M2M communication protocols) are to be provided, with the underlying idea of providing machine tool controls with a single external data transmission interface that uses a universal M2M communication protocol for data transmission.

However, various such M2M communication protocols are known in the prior art, and it is not foreseeable that one of these known M2M communication protocols could prevail as the standard protocol used in the future. Known M2M communication protocols are e.g. the protocols OPC UA, MTConnect, AMPQ or MQTT.

Even if newer versions of machine tool controls are to support one or more M2M communication protocols, or newer versions of M2M communication protocols are to allow compatibility between each other, older existing versions of controls would still need to be retrofitted or replaced on machine tools already in use.

With regard to the problems mentioned above, it is an object of the present invention to provide a data storage device for use on a numerically controlled machine tool capable of avoiding the problems mentioned above.

With regard to the problems mentioned above, it is in particular an object of the present invention to provide a data transmission solution between machine tools and external data processing devices (e.g. servers or server networks) which allows data exchange and uniform machine status monitoring in a simple, efficient and reliable way, in particular in a system with a plurality of different machine tools—partly of different series and of different year of manufacture and partly with very different controls of different manufacturers and different control versions—and with external data processing devices for status monitoring of the machine tools.

In particular, it is an object of the present invention to provide a standardized, simpler, clearer data transmission or data interface solution for monitoring the machine states of different machine tools with different controls, which in addition can be used universally regardless of machine tool type and/or control type.

SUMMARY

In order to solve the above problems, a data interface device for use on a numerically controlled machine tool as defined in independent claim 1 is proposed according to the invention. Dependent claims, system claims or parallel claims concern preferred embodiments of the present invention.

According to one aspect of the invention, a data interface device is proposed for data transmission between an external data processing device and a numerically controlled machine tool, comprising a control device for controlling a plurality of actuators of the machine tool.

According to one aspect of the invention, the data interface device comprises a control interface unit for data transmission with one or more control devices of respective machine tools.

Such a control interface unit may be provided as a software component of one or more computer facilities and as a hardware component of one or more computer facilities or as a combination. The control interface unit can be connected directly or indirectly, e.g. via a local or global network, to one or more control devices (NC and/or PLC control devices) of the respective machine tools or it can also be integrated into the control device.

According to one aspect of the invention, the data interface device preferably comprises a data processing device for processing data, in particular machine tool data or signal value data (e.g. sensor and/or control signals of the machine tool), in particular data received at least via the control interface unit.

According to one aspect of the invention, the data interface device preferably comprises a first data storage device having a first storage medium (e.g. preferably a non-volatile storage medium, e.g. in the form of one or more hard disks and/or one or more SSD storage media) for storing data received via the control interface unit and/or data processed by data processing, and a second storage medium (e.g. preferably a non-volatile storage medium, e.g. in the form of one or more hard disks and/or one or more SSD storage media, or possibly non-volatile RAMs or NVRAMs) for storing configuration data.

According to one aspect of the invention, the data interface device preferably comprises a communication unit for data transmission with the one or more external data processing devices. Such a communication unit may be provided as a software component of one or more computer facilities and as a hardware component of one or more computer facilities or as a combination. The communication unit can be connected directly or indirectly, e.g. via a local or global network, to one or more external data processing devices (e.g. computers, machine tool front-end control devices, data servers, web servers, database systems, and cloud systems).

According to one aspect of the invention, the configuration data may indicate, preferably for one or more control devices of respective machine tools, a communication protocol used or supported by the respective control device of the respective machine tool from a first group of communication protocols.

Thereby, the first group of communication protocols preferably includes several communication protocols supported by machine tool controls from different manufacturers or control versions, such as OPC-based communication protocols, UDI-based communication protocols, and/or proprietary communication protocols, which are respectively supported by different machine tool controls from different manufacturers, such as NC/PLC control systems from Siemens, Heidenhain, Fanuc, Mitsubishi, etc.

According to one aspect of the invention, the configuration data may indicate, preferably for one or more external data processing devices, a communication protocol used or supported by the respective external data processing device from a second group of communication protocols.

In particular, the second group of communication protocols thereby preferably includes several M2M communication protocols ("M2M" for machine-to-machine), possibly including so-called universal M2M communication protocols, such as communication protocols based on OPC UA, communication protocols based on MQTT, communication protocols based on MTConnect, and/or communication protocols based on AMPQ.

It should be noted that the first and second groups of communication protocols can only each include different communication protocols, however, can also overlap in the sense that one or more communication protocols of one group are also included in the other group.

According to a functional embodiment, the control interface unit is preferably adapted to use or support each of the communication protocols from the first group of communication protocols for data transmission (in particular with machine tool controls or machine tool control devices).

This means in particular preferably that the control interface unit is preferably adapted to receive and decode data packets of the various communication protocols from the first group (in particular to decode any header data in accordance with the respective communication protocols). Preferably, this also means that the control interface unit is preferably adapted to send and encode data packets of the various communication protocols from the first group (in particular to encode or generate any header data according to the respective communication protocols). Furthermore, this means in particular that the control interface unit can establish communication connections and/or carry out data transmissions (preferably bidirectional) with devices that support or use a communication protocol of the first group for communication or data transmission.

According to a functional embodiment, the control interface unit is preferably adapted to select, for data transmission with the control device(s) of the machine tool(s), the communication protocol used by the respective control device of the respective machine tool on the basis of the configuration data, in particular to communicate with the corresponding control device with the communication protocol used or supported by it, to establish the communication connection and/or to carry out the data transmission.

According to a functional embodiment, the communication unit is preferably adapted to use or support each of the communication protocols from the second group of communication protocols for data transmission, in particular for data transmission with one or more external data processing devices.

This means in particular preferably that the communication unit is preferably adapted to send and encode data packets of the various communication protocols from the second group (in particular to encode or generate any header data in accordance with the respective communication protocols). Preferably, this also means that the communication unit is preferably adapted to receive and decode data packets of the various communication protocols from the second group (in particular, to decode any header data according to the respective communication protocols). Furthermore, this means in particular that the communication unit can establish communication connections and/or carry out data transmissions (preferably bidirectional) with devices that support or use a communication protocol of the second group for communication or data transmission.

According to a functional embodiment, the communication unit is preferably adapted to select, for data transmission with the one or more external data processing devices, on the basis of the configuration data, the communication protocol used by the respective external data processing device(s), in particular to communicate with the corresponding external data processing device with the communication protocol used or supported by it, to establish the communication connection and/or to carry out the data transmission.

According to a preferred functional embodiment, the control interface unit is adapted to transmit data (preferably in parallel) with several simultaneously connected control devices of respective machine tools.

Preferably, the configuration data for each of the connected control devices indicate the communication protocol used by the respective control device from the first group of communication protocols. This has the advantage that the control interface unit which supports several communication protocols of the first group, can select and use the communication protocol used by the respective control device in a flexible, simple and reliable manner with the respective control device (in particular, e.g., if data packets are to be transmitted in order to request the control device, transmit data, or actively read data at the control).

The control interface unit is preferably adapted to select the communication protocol used by one of the control devices for data transmission with one of the connected control devices on the basis of the configuration data and to select the communication protocol used by the other control device for data transmission with another of the connected control devices on the basis of the configuration data.

If one or more control devices are connected or disconnected, this can be easily specified or stored in the configuration data so that the control interface unit can select and use the appropriate communication protocol.

According to a preferred functional embodiment, the communication unit is adapted to transmit data (preferably in parallel) with several connected external data processing devices.

Preferably, the configuration data for each of the connected external data processing devices indicate the communication protocol used by the external data processing device from the second group of communication protocols. This has the advantage that the communication unit, which supports several communication protocols of the second group, can select and use the communication protocol used by the external data processing device in a flexible, simple and reliable way (in particular if data packets are to be transmitted in order to transmit or receive data packets).

The communication unit is preferably adapted to select, for data transmission with one (or more) of the connected external data processing devices, the communication protocol used by the one (or more) connected external data processing device(s) on the basis of the configuration data, and in particular to select, for data transmission with another of the connected external data processing devices, on the basis of the configuration data, the communication protocol used by the other connected external data processing device.

If one or more external data processing devices are connected or disconnected, this can be easily specified or stored in the configuration data so that the communication unit can select and use the respective communication protocol appropriately.

According to a preferred functional embodiment, the configuration data for one or more machine tools, each preferably comprising a plurality of sensors for outputting sensor signals relating to a machine status of the respective machine tool to the control device of the respective machine tool, preferably specify a respective group of sensors of the respective machine tool and/or reading and/or processing rules for sensor signals of the group of sensors of the respective machine tool.

This has the advantage that, depending on the machine tool type, machine tool configuration, sensor equipment of the machine tool or machine tool manufacturer, the existing sensors or the existing sensor equipment of the machine tool can be defined in the configuration data for the respective machine tool or can also be adapted when the machine tool is extended or retrofitted with newer, different or additional sensors.

Preferably, the data interface device comprises a readout unit for reading sensor signal values from the sensor signals of the group of sensors of the machine tool specified in the configuration data via the control interface unit based on the readout rules specified in the configuration data.

The data processing device is preferably set up to process the sensor signal values read out by the read-out unit into aggregated sensor data on the basis of the processing rules specified in the configuration data.

Therefore, the available or readable machine data or sensor data can be read out or received in a simple and reliable manner for each individual machine, wherein it is also preferable to use potentially individual read-out and/or processing rules to define for each individual machine how the data is available and/or can be read out or how it can or should be further processed or aggregated. This can, for example, also be set or defined for individual control and/or individual sensors (in particular, e.g. by defined readout intervals for different machines or different sensors of a machine).

According to a preferred functional embodiment, the data processing device is adapted ed to generate data sets of a predetermined data format preferably independent of the communication protocols of the first and/or second groups, in particular preferably on the basis of the data received via the control interface unit, in particular preferably on the basis of the data processed by the data processing device and/or in particular preferably on the basis of the data stored by the data storage device.

This has the advantage that regardless of the used communication protocols of the control device(s) or the used communication protocols of the external data processing devices(s), a uniform data format, in particular for user data (payload data) of data packets to be generated, can be provided so that even in highly inhomogeneous systems, which are interchangeable between many machine tools of different manufacturers and with different controls, data in a uniform data format can be exchanged, and also in this uniform data format can be transmitted to a large number of external devices and systems with different communication protocols, and in such inhomogeneous systems can be uniformly evaluated and compared.

This enables a highly uniform data transmission and data evaluation solution in such inhomogeneous systems which include many machine tools from different manufacturers and with different controls and/or a multitude of different data collection and data evaluations so that machine states in large workshops and also beyond the boundaries of workshops can be determined, observed, evaluated and analyzed in a simple, uniform, reliable and comparable manner.

According to a preferred functional embodiment, each generated data set preferably includes identification data that indicate an identity of one or more machine tools, an identity of one or more machine tool components and/or an identity of one or more sensors with respect to the data set underlying the generated data set. This makes it possible in a simple manner to carry out machine states of different machine tools, machine tool components or sensor systems and to store them in traceable and evaluable databases, since it is always known for each data record which machine, machine component or sensor system the corresponding data record can be assigned to.

According to a preferred functional embodiment, each generated data set gives value data and specifies one or more time stamps associated with the value data (so that the time of data entry, output and/or evaluation of the respective value data can be stored advantageously).

Preferably, the value data each indicate one or more data values, such as e.g. one or more sensor signal and/or control signal values, one or more data values calculated from several signal values (as e.g. mean values over certain time intervals, compressed signal values, values calculated on the basis of several signals, converted values, e.g. by conversion into a uniform unit system) and/or one or more state values indicating a machine status of one or more machine tools.

Status values indicating the machine status of one or more machine tools can, for example, preferably be calculated on the basis of one or more read-out signal values (and/or control signal values) and/or can also be read out directly from the control. Such state values can preferably indicate a state (e.g. from a group of given possible states) of a machine tool, a machine tool component and/or a sensor system or of components or assemblies of the machine tool.

Preferably, a data type is specified for each data set and/or for each value of the value data, the data type preferably indicating whether the corresponding value (value data) describes a machine status, a signal value (or a value indicating several signal values) or an operating event during the operation of a corresponding machine tool.

This can be done e.g. by the types "STATUS" (if e.g. a status of a machine tool, a machine tool component and/or a sensor system or of components or assemblies of the machine tool is specified), "EVENT" (if e.g. an event on a machine tool, a machine tool component or similar is specified (e.g. a machine stop, an emergency stop, a collision during machining on the machine tool, a maintenance or repair event if a warning is issued, or similar), and "VALUE" if, for example, only instantaneous, aggregated or averaged sensor signal values or control signal values are specified.

According to a preferred functional embodiment, the data processing device is preferably adapted on the basis of signature data stored in the second storage medium to add an electronic signature to a generated data set and/or to verify signatures added to data sets. This allows to provide data sets with signatures for later possible data checks or to verify added signatures, e.g. on the basis of signature data stored in the configuration data (or on the basis of signature data read out from the control device, if e.g. an operator currently logged in or authenticated at the machine tool has stored a personal (electronic) signature at the control device or is logged in with it.

According to a preferred functional embodiment, the data processing device is preferably adapted on the basis of encryption data stored in the second storage medium to encrypt a generated data set and/or to decrypt encrypted data sets on the basis of encryption data stored in the second storage medium. This has the advantage that the data transmitted via local or even global networks may contain sensitive data (e.g. in the event that these are collected by machine tools of different users, e.g. by the machine tool or control manufacturer, in order to be able to process the data), offer automatic maintenance monitoring with remote diagnostics for different users, or to evaluate long-term operational status developments for the improvement and development of new types of machine tools), can be encrypted for transmission (e.g. via the Internet or in the cloud) in a simple, reliable and secure manner.

According to a preferred functional embodiment, the data processing device is further adapted to add an identification signature or number to a generated data set. This allows the identity of the data interface device to be easily stored in the data set (in particular as a unique identification of the data source), e.g. for systems in which several data interface devices according to the invention are used in parallel and/or in series.

According to a preferred functional embodiment, the communication unit is adapted to generate, for data transmission with the external data processing device, a data packet comprising header data and payload data, the header data being generated preferably on the basis of the communication protocol used by the external data processing device and/or the payload data comprising one or more data sets generated by the data processing device of the data format independent of the communication protocols of the first and second groups.

This allows to easily separate the structures of the non-uniform communication methods (communication protocols) from the transmitted content and still provide this content advantageously in a standardized form, since the header information is always protocol-dependent, however, the transmitted content (data sets) of the easily extractable user data (payload data) are always machine-independent, control-independent and protocol-independent and have the simple and reliable uniform data format.

According to a preferred functional embodiment, the control interface unit is adapted to generate a data packet containing header data for data transmission with the control device, the header data being generated on the basis of the communication protocol used by the control device.

According to a preferred functional embodiment, the data processing device is adapted to generate and/or send to the communication unit one or more data sets at regular time intervals, in particular preferably specified in the configuration data, on the basis of processing rules specified in the configuration data, in particular preferably with an instruction to transmit the one or more data sets in one or more data packets in accordance with one or more communication protocols of the second group. Thus, the transmission intervals for regular data transmissions (e.g. for ongoing status checks and/or machine monitoring) can be set advantageously simple in the configuration data.

According to a preferred functional embodiment, the communication unit is adapted to transmit the one or more data sets in one or more data packets in accordance with one or more communication protocols of the second group to a plurality of interconnected external data processing devices in accordance with a publish subscriber model, the configuration data preferably comprising in particular subscriber identification data preferably indicating one or more of the interconnected external data processing devices as registered subscribers.

This has the advantage that the data interface device can easily transmit the corresponding data sets to all external data processing devices from one or more subscriber groups (which may receive different data sets), wherein external data processing devices can easily subscribe as subscribers to receive the corresponding data sets associated with the respective subscriber group (e.g. on the basis of an assignment of contents and/or data set types to the respective subscriber group), or can stop receiving by unsubscribing from the respective subscriber group.

According to a preferred functional embodiment, the communication unit comprises a data set output unit which can be connected directly or via a data network to a control interface unit of another data interface device in accordance with one of the foregoing (and later described) aspects, preferably for transmitting data sets generated by the data processing device to the other data interface device.

This has the advantage that the data interface device according to the invention (e.g. according to one of the aspects and examples described here) can also transmit data sets via the communication unit to another connected data interface device according to the invention (e.g. according to one of the aspects and examples described here), e.g. in order to collect the data sets of different data interface devices connected in parallel at the "superordinate" data interface devices.

According to a preferred functional embodiment, the control interface unit comprises a data set receiving unit which can be connected directly or via a data network to a communication unit of another data interface device in accordance with one of the foregoing (and later described) aspects, preferably in order to receive from a data processing device of the other data interface device.

This has the advantage that the data interface device according to the invention (e.g. according to one of the aspects and examples described here) can also receive data sets by means of the control interface unit from one or preferably several connected other data interface devices according to the invention (e.g. according to one of the aspects and examples described here), e.g. in order to collect the data sets of different "subordinate" data interface devices connected in parallel at the "superordinate" data interface devices (e.g. for evaluation, long-term storage, verification, aggregation, etc.).

Thereby, transmission speeds can also be increased and the overall data flow can be optimized, since a common protocol between data interface devices and common or coordinated presets in the respective configuration data can be used, wherein the entire system of interconnected data interface devices can ensure "outwardly" the use for a wide variety of applications with many controls (i.e. different control protocols will continue to be supported by the control interface units of the "subordinate" data interface devices) and many external data processing devices (i.e. different M2M protocols will continue to be supported by the communication unit of the "superordinate" data interface device). Thereby, preferably, a large number of connections are possible (e.g. one-to-many, many-to-one, many-to-many, many-to-many-to-one, many-to-one-to-many, etc.).

According to a preferred functional embodiment, the communication unit is adapted to receive configuration instructions from an external data processing device, wherein the data processing device is preferably adapted to modify the configuration data stored in the data storage device and/or to store new configuration data on the basis of the configuration instructions received via the communication unit. Thus, the underlying configuration data can be easily adapted, adjusted, changed or optimized. In addition, it is possible to respond flexibly to system changes, e.g. when machine tools, machine tool controls, machine tool systems are extended, retrofitted, equipped with additional functions and/or components, or when components, machines or similar are exchanged, or also when the data sets to be generated, the value data to be generated are to be adapted, optimized or adjusted.

According to a preferred functional embodiment, the data storage device comprises a data interface which is preferably adapted to transmit the data stored in the first data storage medium to an externally connected data storage device for data backup and/or long-term storage, in particular preferably in accordance with a synchronous, asynchronous data transmission or data mirroring which is carried out at regular intervals and/or when a limit value of the amount of data stored in the first data storage medium is exceeded. This has the advantage that (e.g. via direct or at least local connections) the data can be stored, saved or stored for a long time. For example, it is conceivable to store all (or selected) read raw data and/or calculated data sets directly in the connected data storage device so that the data can always be backed up locally despite any power failures, without even having to provide too large data storage media at the data interface device which can be provided directly at each machine tool or machine tool group.

According to a preferred functional embodiment, the external data storage device is connected via a local or global network, and preferably comprises an external data server (for data storage, evaluation and/or further transmission), a web server (for evaluation or preferably to enable access to the data or data sets or evaluation data, e.g. via web applications via local, global networks or even the Internet), an external message broker unit (e.g. for sharing the received data sets among different units and systems) and/or another data interface device according to one of the above aspects; or preferably being configured as an external data server, a web server, an external message broker unit and/or another data interface device according to one of the above aspects.

According to a further aspect, a system is proposed comprising one or more data interface devices according to one of the above aspects and one or more external data processing devices preferably connected via a local or global data network to a communication unit of at least one of the data interface devices, in particular preferably a communication unit of at least one of the data interface devices being connected via a local or global data network to a control interface unit of another data interface device.

In summary, a data transmission solution between machine tools and external data processing devices (e.g. servers or server networks) is provided which enables data exchange and uniform machine status monitoring in a simple, efficient and reliable manner, in particular in a system with a large number of different machine tools— partly of different series and with different year of manufacture and partly with very different controls of different manufacturers and different control versions—and with external data processing devices for status monitoring of the machine tools.

In particular, a standardized, simpler, clearer data transmission or data interface solution can be provided for monitoring the machine states of different machine tools with different controls, which can also be used universally regardless of machine tool type and/or control type.

In addition, the invention offers the advantage that sensor data and machine status data or the above-mentioned data sets can be transmitted via local or global networks from several machine tools, even from very different locations, in a simple and universal manner, thus, e.g. also in order to enable standardized remote maintenance diagnoses or advantageous comparative analyses of the sensor data of different machine tools or also of the same machine tools used under different conditions and at different locations.

Further aspects and their advantages as well as advantages and more specific embodiments of the aspects and features described above are described in the following descriptions and explanations of the attached Figures, which are not to be understood in any restrictive way.

BRIEF DESCRIPTION OF THE FIGURES

FIG. 2 shows an exemplary schematic representation of a system according to another embodiment of the invention.

DETAILED DESCRIPTION OF THE FIGURES AND PREFERRED EMBODIMENTS

Figure 1:
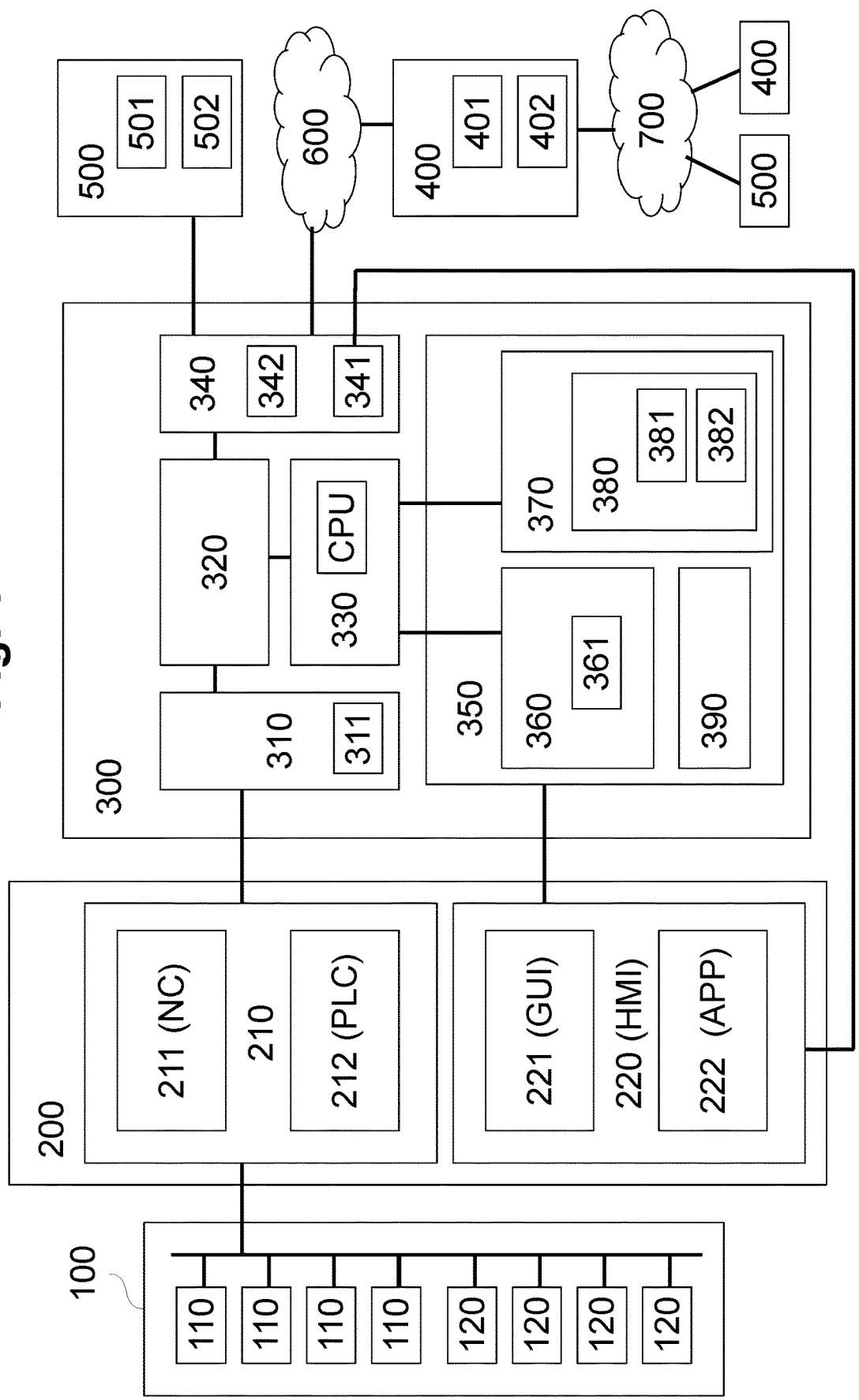
FIG. 1 shows an exemplary schematic representation of a system with a data storage device according to an embodiment of the invention.

In the following, examples and embodiments of the present invention are described in detail with reference to the attached Figures. Same or similar elements in the Figures can be identified with the same reference signs, but sometimes also with different reference signs.

However, it should be stressed that the present invention is in no way limited or restricted to the embodiments described below and their features, but further includes modifications of the embodiments, in particular those covered by modifications of the features of the examples described or by combination of one or more of the features of the examples described within the scope of protection of the independent claims.

According to the invention, thereby, in embodiments, a data interface device for use on a numerically controlled machine tool and in connection with external data processing devices (e.g. data server, web server, computer, PC, notebook, tablet and/or smartphone) or in connection with external data networks (LAN, WAN, Intranet, and/or Internet) is proposed, wherein the machine tool comprises a control device (e.g. NC and/or PLC) for controlling a plurality of actuators of the machine tool and a plurality of sensors for outputting sensor signals relating to a machine status of the machine tool to the control device.

This enables, for example, improved condition monitoring, i.e. permanent and/or regular acquisition of machine process data (e.g. temperatures, loads, vibrations) from corresponding sensors of the machine tool to determine the machine status (e.g. the current machine condition, an average machine condition, a machine condition at a previous point in time or in a previous period, or a machine condition at peak machining times in the limit range).

By subsequent calculations and analyses of these determined data, it is possible to derive advantageous changes of the entire machine or individual assemblies in order to dynamically adapt service intervals, for example ("predictive maintenance"). In addition, the process data determined offer the processor, operator or the company using the machine tool the possibility of optimizing the machining of workpieces on the machine tool through greater transparency.

On the one hand, this makes it possible to preferably present or display machine states and on the other hand to display, plot or evaluate a history of sensor signals or sensor data on the machine tool as a function of time (time course). This enables a preferred efficient detection of problem areas. Furthermore, the collected sensor data and further information on a time course of the machine status can be used advantageously for predictions. For example, it is possible to display the degree of wear of individual components and ultimately the expected remaining service life. This can be considered e.g. for pure consumables (e.g. lubricant tanks) on the basis of filling levels. In addition, additional sensor packages (e.g. quality sensors or special sensors for condition monitoring) can be offered to upgrade the existing sensor data of the machine tool with additional sensor data.

According to the invention, a data interface device with a data processing device for use on a numerically controlled machine tool is thereby proposed in embodiments, which can calculate data sets on the basis of read sensor data from the machine tool and transmit them to external data processing devices, e.g. to enable a status analysis or status display on the basis of the collected sensor data for one and also several connected machine tools. This may include a plotter function for displaying a time history of one or more sensor signals, a process analysis (e.g. searching for events, as e.g. limit value excess of individual or multiple sensor signals) on the basis of sensor data collected over a predetermined period of time, a history-based program analysis, and/or predictions for maintenance or replacement needs, e.g. on the basis of fill level display-based and/or counter-based residual service life predictions for components and parts of machine tools as well as required consumables (e.g. filter change, coolant lubricant change or required refilling actions for consumables) on the basis of automated analyses of the collected sensor data.

In the following, first general examples are described, which take up, develop or repeat aspects of the above summary, and in any case can always be combined with aspects of the above summary and aspects of the following description of the Figures.

The available sensors on the machine tool and the availability of the sensor values on the control can be very different depending on the type of machine and/or control.

For this purpose, for example, it can be provided in configuration data for reading out and processing the sensor data in a modifiable manner to determine which sensors are available on the machine tool or are to be read out, and how the respective sensor values are to be read out (e.g. by defining predetermined individual read-out rates) and/or how the read-out sensor values are to be processed and stored (processing rules).

On the basis of the individually configurable configuration data, the data interface device can be exemplarily used in a variety of ways and can be used on machines with a comprehensive sensor package with a large number of optional sensors, but can also be retrofitted to existing machines by using the configuration data, depending on the type and number of available sensors and control-dependent readout options, to configure the readout function and further processing function individually to the respective machine and its controller or to adapt it to the requirements, and still to transmit the sensor data to other data processing devices with different M2M protocols independently of the machine and control.

The configuration data can be stored e.g. in a configuration file in a universal data format in a markup language (e.g. as XML file).

For certification purposes, the configuration data can also indicate the sensor signal channels that must be supplied for certification, i.e. which sensor signals or which events in connection with which sensor signals are to be stored in certification data.

According to a preferred aspect, the data processing device may be adapted to compress and/or encrypt the sensor data stored in the first storage medium for data transmission. This has the advantage that data security during transmission as well as the avoidance of unauthorized access is enabled, as well as an efficient data storage of compressed data for long-term storage purposes.

According to an exemplary aspect, the data processing device may be adapted to transmit calculated data sets, data sets stored in the first storage medium and sensor data collected over a predetermined period of time or data sets comprising the sensor data over a local or global network. In the meantime, the data can be buffered at the data storage device (also for security reasons to avoid data loss in case of network problems) and this also enables simple and controlled, if necessary automatic, transmission of data in packets e.g. at predetermined time intervals or data volumes and if necessary at predetermined times.

According to a preferred aspect, the transmitted sensor data and/or data sets can also include a machine type of the machine tool, a machine configuration of the machine tool and/or machine identification data, including in particular a machine number, of the machine tool. This has the advantage that a comparison and an identification of the machine tool and/or the working conditions of the machine tool or the machine type is simplified, in particular with analyzing comparison of the data of different machines.

According to a preferred aspect, the communication unit may provide a web interface and/or a web service application through which an external data processing device may be granted access to aggregated sensor data stored in the first storage medium, preferably by means of a web browser and/or a web application. In this case, an Internet communication protocol may be included in the second group of communication protocols. This has the advantage that display and analysis of the data is made possible simply and efficiently via web interfaces and web browser access so that a multitude of external data processing devices (e.g. computers, notebooks, tablets, smartphones) can also access, display and/or analyze the data simply and universally via a web application and/or via a link via a web browser.

According to a preferred aspect, the configuration data further may specify a data format, and the data processing device may preferably store read, converted, aggregated or calculated data in the data format specified in the configuration data in the first storage medium. This has the advantage that a universal but also universally configurable data format is made possible, even with different machine and control configurations or sensor availabilities so that machine-independent and control-independent sensor data can be provided for universal access by a multitude of different external data processing devices in a universal data format.

According to a preferred aspect, the communication unit may be connectable to a human-machine interface of the control device of the machine tool, preferably for transmitting data stored in the first storage medium to the human-machine interface, preferably for display on a graphical user interface of the human-machine interface of the control device of the machine tool. This has the advantage that the data can also be displayed, read out, analyzed or viewed at a human-machine interface of the control so that an operator can operate the machine control directly at the machine tool on the basis of the display and/or analysis of the sensor and/or certification data.

According to a preferred aspect, the first storage medium may include a ring buffer and the read and/or calculated data and/or generated data sets may preferably be stored in the ring buffer. This has the advantage that after a predetermined data volume, in particular after transmission of the data to an external data processing device, data memory is available for newly collected data. The data storage volume to be made available in the ring buffer is preferably configurable, e.g. via the configuration data.

According to a preferred aspect, the data processing equipment may furthermore be adapted to store sensor data together with a corresponding time stamp in the first storage medium. This has the advantage that an analysis is made possible and a data history can be recorded.

According to a preferred aspect, the readout rules of the configuration data can specify an individual readout frequency for one, several or all sensor signals of the group of sensors of the machine tool specified in the configuration data. The readout unit is then preferably set up to read out sensor signal values for a corresponding sensor signal with the corresponding individual readout frequency specified in the configuration data. This has the advantage that individual sensor signal readout rates can be configured as required.

According to a preferred aspect, at least one individual readout frequency specified in the configuration data may be smaller than a sensor value memory frequency of a stored programmable control and/or than a sensor value storage frequency of an NC control of the control device. This advantageously enables a more control-independent universal readout characteristic.

According to a preferred aspect, the processing rules of the configuration data can indicate an individual processing rule for one, several or all sensor signals of the group of sensors of the machine tool specified in the configuration data. Preferably, the data processing device may then be adapted to calculate a single sensor value for a corresponding sensor signal from a plurality of sensor signal values read out over a period of time specified in the individual processing rule on the basis of the corresponding individual processing rule specified in the configuration data and to store it in the first storage medium. This has the advantage that processing rules can also be configured to reduce the data volume to be stored as required, e.g. by aggregating several signal values of a sensor to one signal value to be stored.

According to a preferred aspect, an individual processing rule may indicate that the sensor value is to be calculated as an average of the plurality of sensor signal values read over a period of time specified in the individual processing rule, and/or an individual processing rule may indicate that the sensor value is to be calculated as a maximum value or minimum value of the plurality of sensor signal values read over a period of time specified in the individual processing rule. It is also possible to convert units of parameters into other unit systems.

According to a preferred aspect, the processing rules of the configuration data can indicate a combination rule for at least two sensor signals of the group of sensors of the machine tool specified in the configuration data. The data processing device may then be adapted to calculate a combined sensor value for sensor values of the at least two sensor signals on the basis of the combination rule and to store it in the first storage medium. This has the advantage that processing rules can also be configured to reduce the data volume to be stored as required, e.g. by combining several signal values of several sensors into one signal value to be stored (e.g. several sensor signals relating to the same machine component).

According to a preferred aspect, the configuration data for one, several or all sensor signals of the group of sensors of the machine tool specified in the configuration data may include certification rules. The data processing equipment may also be adapted to generate certification data and store the generated certification data on the basis of the certification rules specified in the configuration data and on the basis of the corresponding sensor signals read out. This has the advantage that sensor data storage can be easily and efficiently combined with any required certification of the processes. This means that certification does not have to be performed retrospectively on the basis of the stored sensor data.

According to a preferred aspect, the certification data may indicate when and/or at which position of an NC program executed on the control device of the machine tool one or more of the sensor signals specified in the certification rules exceeded a corresponding limit value. Alternatively or additionally, e.g. if no limit value has been exceeded, it can be indicated that none of the sensor signals specified in the certification rules has exceeded the corresponding limit value during a specified period or during the execution of the NC program.

According to a preferred aspect, the communication unit may be adapted to allow the external data processing device access to configuration data stored in the second storage medium, in particular preferred for modification of the configuration data. This has the advantage that the configuration data can be configured as required, e.g. if different or additional readout or processing rules are to be set, or also if the machine is retrofitted with sensors or the controller is extended.

According to a preferred aspect, the configuration data can specify one or more individual limit values for one, several or all sensor signals of the group of sensors of the machine tool specified in the configuration data. The data processing device may be adapted to store in the first storage medium the limit values associated with calculated sensor values and specified in the configuration data. This facilitates the later analysis of the data, since the corresponding limit value is also stored, respectively.

According to a preferred aspect, a readout unit of the control interface unit or the data processing device may be adapted to read meter readings from registers of a programmable control of the control device of the machine tool via the control interface unit.

According to a preferred aspect, the data processing equipment may furthermore be adapted to store read meter readings in the first storage medium, in particular preferably together with a time stamp.

FIG. 1 shows an exemplary schematic representation of a system with a data storage device according to an embodiment of the invention.

The system includes the data interface device 300, a machine tool 100, a control device 200 of the machine tool 100 and an external data processing device 400.

The machine tool 100 exemplarily includes a plurality of actuators 110 of the machine tool 100 controllable by the control device 200, and a plurality of sensors 120 for outputting to the control device 200 sensor signals relating to a machine status of the machine tool 100.

Actuators 110 can include, for example, drives for controllable linear and rotary axes (swivel and/or rotary axes) for a controlled relative movement between tool and workpiece, and also drives for tool-carrying work spindles (e.g. on milling machines) or workpiece-carrying work spindles (e.g. on lathes). Furthermore, the actuators 110 can be electronically, hydraulically and/or pneumatically controlled valves, pumps or other supply devices from internal or external coolant lubricant supply or compressed air supply. Conveyors, pallet changers, workpiece changers, tool magazines and other machine tool accessories can also be controlled via drives or circuits or corresponding actuators.

The sensors 120 can be e.g. sensors, which can be assigned to the respective assemblies or components of the machine tool, e.g. the axes, the drives, axle bearings, the spindles, spindle bearings, a tool magazine, a tool changer, a pallet or workpiece changer, an internal or external coolant lubricant supply device, a chip conveyor device, and/or a hydraulic and/or pneumatic control. A variety of different sensors can be provided for the individual assemblies, e.g. position measuring sensors, current and/or voltage measuring sensors, temperature sensors, force sensors, acceleration sensors, vibration sensors, bearing diagnosis sensors, displacement sensors, level indicator sensors, liquid sensors (e.g. for measuring PH values in coolant lubricants, water content measuring sensors for oil, coolant etc.), water content sensors in pneumatic systems, and/or filter condition sensors.

The available sensors on the machine tool and the availability of the sensor values on the control can be very different depending on the type of machine and/or control.

For this purpose, the invention exemplarily provides to determine in configuration data for reading out and processing the sensor data in a modifiable manner which sensors are available on the machine tool or are to be read out, and how the respective sensor values are to be read out (e.g. by defining predetermined individual read-out rates) and/or how the read-out sensor values are to be processed and stored (processing rules).

On the basis of the individually configurable configuration data, the data storage unit according to the invention can be used in a variety of ways and can be retrofitted to machines with an extensive sensor package with a large number of optional sensors, but also to existing machines, as the configuration data enables the readout function and further processing function of the data storage unit to be individually adapted to the respective machine and its control or to be configured according to requirements, and still to transmit the sensor data to other (external) data processing devices via the data interface device 300, independent of the machine and control.

The configuration data can be stored e.g. in a configuration file in a universal data format in a markup language (e.g. as XML file).

The control unit 200 comprises, for example, a control 210 with an NC control 211 and a programmable logic control 212 (also called PLC for "Programmable Logic Control").

Furthermore, the control unit 200 includes, for example, a human-machine interface 220 (also called HMI for "Human-Machine-Interface"), which enables an operator of the machine tool 100 to control, monitor and/or operate the machine tool 100. The man-machine interface 220 includes, for example, a graphical user interface 221 (also called GUI for "Graphical User Interface") that can be displayed on a monitor or touchscreen.

The data interface device 300 exemplarily comprises a first interface unit 310 (control interface unit), a read-out unit 320, a processor-controlled data processing unit 330, a second interface unit 340 (communication unit), and a data memory 350 (data storage device) with a second storage medium 360 and a first storage medium 370.

The second (preferably non-volatile) storage medium 360 (e.g. an NVRAM, a hard disk or a flash memory or SSD memory) exemplarily stores configuration data 361 which specifies, for example, a group of sensors 120 of the machine tool 100 as well as readout and processing rules for sensor signals of the group of sensors 120 of the machine tool 100, and the first storage medium 370 (e.g. one or more hard disks and/or flash memory) comprises, for example, a database or data storage device 380 for storing sensor data 381 (or calculated data sets) and certification data 382, or for storing data and/or data sets which have been calculated, created, generated or converted by the data processing unit 330.

The data storage device 350 further exemplarily comprises a data interface 390 which is adapted to transmit the data stored in the first data storage medium 370 to an externally connected data storage device 800 for data backup and/or long-term storage, in particular preferably in accordance with a synchronous, asynchronous data transmission or data mirroring which is carried out at regular intervals or when a limit value of the amount of data stored in the first data storage medium is exceeded.

The readout unit 320, for example, is adapted to read sensor signal values of the sensor signals of the group of sensors 120 of the machine tool 110 specified in the configuration data via the first interface unit 310 (control interface unit) from the control device 210 (e.g. from registers of the PLC 212), in particular, for example on the basis of the readout rules specified in the configuration data.

The data processing unit 330 is exemplarily adapted to rawly store the sensor signal values read out by the read-out unit, to process the calculated, converted or aggregated sensor data, in particular exemplarily on the basis of the processing rules specified in the configuration data, and to store the processed, aggregated sensor data 361 in the second storage medium 380 of the database 380.

The second interface unit 340 (communication unit) is exemplarily adapted for data transmission with an external data processing device.

As an example of such external data processing devices, FIG. 1 exemplarily shows that the second interface unit 340 is connected to the man-machine interface 220 of the control device 200, in such a way that, for example, an operator can have sensor data 381 displayed or the sensor data 381 accessed by means of an application 222 and the graphical user interface 221 of the man-machine interface 220, and/or can view or, if required, modify the configuration data 361 via the graphical user interface 221, e.g. in order to change or to view the readout and/or processing rules. The group of sensors 120 to be read out can also be viewed or changed.

As a further example of such external data processing devices, it is shown in FIG. 1 that the second interface unit 340 (communication unit) is connected with a computer device 500 (e.g. an external PC, a notebook, a smartphone or a tablet), which comprises an application 502 and a web browser 501 so that, for example, an operator can have sensor data 381 displayed or access sensor data 381 by means of the application 502 (for example a web application) and/or by means of the web browser 501 can view or, if required, modify the configuration data 361, for example, in order to change or to view the readout and/or processing rules. The group of sensors 120 to be read out can also be viewed or changed. For this, the first interface unit exemplarily includes a web service application 341 corresponding to the application 502 (which as a service application or server application can grant access to the web applications, e.g. applications 222 and/or 502).

As a further example of such external data processing devices, it is exemplarily shown in FIG. 1 that the second interface unit 340 is connected to a server 400 via a local or global network 600 comprising a service application 401 (e.g. analogous to the web service application 341). The Server 400 can request and receive sensor data 381 and certification data 382 via the interface unit 340 (communication unit) and store them locally on the server 400 in a storage medium 402 (e.g. hard disks, flash memory, cloud memory, external storage arrays, etc.) (e.g. in larger amounts of data, if the storage medium 370 comprises a ring buffer for storing the sensor data 381 and/or also for storing sensor data 381 from a plurality of machine tools 100, the controls 210 of which are each connected to a corresponding data storage device 300).

An additional local or global network 700 (e.g. LAN, WAN, Intranet or Internet) can connect an additional server 400 and/or an additional computer facility 500 to the server 400.

According to exemplary aspects, the data interface device 300 according to FIG. 1 is adapted as follows.

The configuration data 361 indicate a communication protocol used by the control device 200 of the machine tool 100 from a first group of communication protocols and the communication protocols used by the external data processing devices 400 and 500, respectively, from a second group of communication protocols. The control interface unit 310 is adapted to use each of the communication protocols from the first group of communication protocols for data transmission and to select the communication protocol used by the control device 200 of the machine tool 100 for data transmission with the control device 200 of the machine tool 100 on the basis of the configuration data 361.

The communication unit 340 is adapted to use each of the communication protocols from the second group of communication protocols for data transmission and to select the communication protocol used by the respective external data processing device for data transmission with an external data processing device on the basis of the configuration data 361.

Thereby, the first group of communication protocols in particular preferably includes several communication protocols supported by machine tool control systems of different manufacturers or control versions, such as OPC-based communication protocols, UDI-based communication protocols, and/or proprietary communication protocols which are supported by different machine tool control systems of different manufacturers, e.g. by NC/PLC control systems of Siemens, Heidenhain, Fanuc, Mitsubishi, etc., respectively.

Furthermore, the second group of communication protocols preferably includes several M2M communication protocols ("M2M" for machine-to-machine), possibly including so-called universal M2M communication protocols, such as communication protocols based on OPC UA, communication protocols based on MQTT, communication protocols based on MTConnect, and/or communication protocols based on AMPQ.

It should be noted that the first and second groups of communication protocols can only each include different communication protocols, however, can also overlap in the sense that one or more communication protocols of one group are also included in the other group.

The data processing device 330 is exemplarily adapted to generate data sets of a predetermined data format independent of the communication protocols of the first and second groups, in particular on the basis of the data received via the control interface unit 310, on the basis of the data processed by the data processing device 330 and on the basis of the data stored by the data storage device 350.

In preferred examples, each generated data set comprises identification data indicating an identity of one or more machine tools, an identity of one or more machine tool component(s) and/or an identity of one or more sensors in respect of the data set underlying the generated data set; and each generated data set preferably indicates value data and one or more time stamps associated with the value data, wherein the value data indicates data values indicating one or more sensor signal and/or control signal values, one or more data values calculated from a plurality of signal values and/or one or more state values indicating a machine status of one or more machine tools. In addition, a data type can be specified for each data set and/or for each value of the value data, wherein the data type specifies, for example, whether the corresponding value describes a machine status, a signal value or an operating event during the operation of a corresponding machine tool.

Furthermore, on the basis of signature data stored in the second storage medium 360, the data processing device 330 can be set up to add an electronic signature to a generated data set and/or to check signatures added to data sets and/or, on the basis of encryption data stored in the second storage medium 360, to encrypt a generated data set and/or to decrypt encrypted data sets on the basis of encryption data stored in the second storage medium 360.

The communication unit 340 is exemplarily adapted to generate a data packet comprising header data and user data for data transmission with the external data processing devices 400 and 500, respectively, wherein the header data is generated on the basis of the communication protocol used by the respective external data processing device and the user data comprises one or more data sets of the data format independent of the communication protocols of the first and second groups generated by the data processing device 330.

The control interface unit 310 is exemplarily adapted to generate a data packet with header data for data transmission with the control device 200, wherein the header data is generated based on the communication protocol used by the control device 200.

The data processing device 330 may generate one or more data sets at regular time intervals, which may be specified in particular in the configuration data 361, on the basis of processing rules specified in the configuration data 361, and send them to the communication unit 340, in particular with an instruction to transmit the one or more data sets in one or more data packets according to one or more communication protocols of the second group.

In further examples, the communication unit 340 may be adapted to transmit the one or more data sets in one or more data packets in accordance with one or more communication protocols of the second group to a plurality of connected external data processing devices in accordance with a publish subscriber model, wherein the configuration data 361 comprise in particular subscriber identification data indicating one or more of the connected external data processing devices as registered subscribers.

A particularly functional example is exemplarily provided in FIG. 1 that the communication unit 340 comprises a data set output unit 342 connectable directly or via a data network to another control interface unit 310 of another data interface device 300 for transmitting data sets generated by the data processing device 300 to the other data interface device 300.

In order to receive such data from other data interface device 300, the control interface unit 310 is exemplarily provided with a data set receiving unit 311 connectable, directly or via a data network, to another communication unit 340 of another data interface device 300, or to its data set output unit 342, to receive 330 data generated by another data processing device from the other data interface device 300.

This is particularly functional, since several data interface devices 300 can be connected in series and partially in parallel by means of the communication connection of the respective data record output units 342 and data record receiving units 311 in order to efficiently exchange data sets or, if necessary, to receive and collect 300 data sets of different data interface devices 300 at a centrally arranged data interface device, or then via their communication unit 340 to make available to other external, advantageously uniform, centralized and reliable, data sets concerning large, protocol-inhomogeneous machine tools placed at several locations, flexibly with several M2M protocols supported by the communication unit 340 and, if necessary, based on an exemplary publish/subscribe model.

FIG. 2 shows an exemplary schematic representation of a system according to another embodiment of the invention.

The data interface devices 300 described in FIG. 2 are, e.g., each exemplarily configured as in FIG. 1, wherein only the communication interfaces are shown in FIG. 2 for simplification, i.e. the respective control interface unit 310 (each having a not shown data set receiving unit 311), the respective communication unit 340 (each having a not shown data set output unit 342), and the optional data interface 390 connected, for example, directly or via a data network (e.g., LAN, WAN, WLAN, Intranet, or the Internet) to a respective external data storage device 800.

As already described, the communication connections between one (or more) data interface(s) 390 and one (or more) external data storage device(s) 800 enable the data stored in the first data storage medium 370 of the respective data interface device(s) 300 to be transmitted to the respective externally connected data storage device 800 for data backup and/or long-term storage, in particular preferably in accordance with a synchronous, asynchronous data transmission or data mirroring carried out at regular intervals or when a limit value of the amount of data stored in the first data storage medium is exceeded.

As an example, the machine tools 100 with their control devices 200 are each connected to a control interface unit 310 of a respective data interface device 300 (analog FIG. 1), wherein, as an example, several machine tools 100 with their control devices 200 can be connected to the same data interface device 300 (see the two left-hand data interface devices 300 in FIG. 2) or, as an example, only one machine tool 100 with its control device 200 can be connected to a single data interface device 300 (see the right-hand machine tool 100 in FIG. 2).

The control devices 200 can respectively use different communication protocols of the (if applicable respective) first group which are supported by the respective control interface units 310. Thus, with a simple and reliable architecture, data from different machine tools can be read out advantageously and uniformly, if necessary at different locations with different controls and their communication protocols used, and their data or sensor data, machine data, machine status data and/or data sets indicating these data can be transmitted advantageously and reliably, efficiently, uniformly and versatilely in different system combinations.

As an example, the left data interface device 300 of FIG. 2 is directly connected to an external computer device 500, analogous to FIG. 1, with the corresponding communication unit 340, in order to transmit data to it by means of an M2M or Internet communication protocol of the second group of communication protocols used by this computer device 500.

In addition, the communication units 340 of the three lower data interface devices 300 are connected via their (not shown) data set output units 342 to the control interface unit 310 of the upper data interface device 300 in FIG. 2, or more precisely to their data set receiving unit 311 as an example. These communication connections can be established directly or also via a data network (locally or globally).

This has the advantage that the upper data interface device 300 in FIG. 2 can efficiently receive and collect data sets of the different "subordinate" data interface devices 300 (e.g. at different locations) in one single common communication protocol and, if applicable, on the basis of optimized and mutually adjusted respective configuration data, as well as transmit these, e.g. via the corresponding data interface 390 and exemplarily via a data network to an external data storage device 800, or to efficiently, uniformly, reliably, and flexibly transmit these collected data sets concerning the multitude of machine tools 100 to the supported M2M communication protocols as well as in a simple manner to other external data processing devices such as computer facilities 500 and server facilities 400 (e.g. data server, web server, message broker server etc.).

The Server 400 can, for example, store sensor data 381 collected by several machine tools 100, locally centralized and make them available for analyses. The data can be transmitted to a central server via a network (e.g. LAN, WAN, WLAN, Intranet or the Internet, or alternatively via the same network 600) and stored there in a globally centralized manner. Additionally or alternatively, the data interface 390 of the superordinate data interface unit 300 can store all data centrally on the external data storage device 800.

The Server 400 can thus store all sensor data and data sets of all machine tools and make them available for display, analysis or comparison in order to display, analyze or generate maintenance or spare parts demand forecasts. The machine tools 100 can even be installed in different workshops or at different locations or at different companies.

In further embodiments, the data processing device 330 of the data interface device may further be adapted to store data or data sets in compressed form (i.e. after data compression) in the data storage device and/or to output data sets in compressed form (i.e. after data compression) as user data to the communication unit 340.

In summary, a data transmission solution between machine tools and external data processing devices (e.g. servers or server networks) is provided which enables data exchange and uniform machine condition monitoring in a simple, efficient and reliable manner, in particular in a system with a large number of different machine tools—partly of different series and with different year of manufacture and partly with very different controls of different manufacturers and different control versions—and with external data processing devices for status monitoring of the machine tools.

This provides an extremely versatile protocol translation function (i.e. in particular control protocol translated to M2M protocol, such as OPC UA, MQTT, MTConnect or AMQP) and at the same time proposes a flexible and efficient data processing and data transmission solution that can be individually adapted with configuration data to the most diverse machine tools.

In particular, a standardized, simpler, clearer data transmission or data interface solution can be provided for monitoring the machine states of different machine tools with different controls, which can also be used universally regardless of machine tool type and/or control type.

Examples or embodiments of the present invention and their advantages are described above in detail with reference to the attached figures. It should again be emphasized that the present invention is in no way limited or restricted to the embodiments described above and their features, but further includes modifications of the embodiments, in particular those covered by modifications of the features of the examples described or by combination of one or more of the features of the examples described within the scope of protection of the independent claims.

The invention claimed is:

1. A data interface device for data transmission between a first numerically controlled machine tool including a first control device for controlling a plurality of actuators of the first machine tool and a first external data processing device, the data interface device comprising:
    a control interface unit for data transmission with the first control device of the first machine tool,
    a data processing device for processing data received at least via the control interface unit,
    a data storage device having a first storage medium for storing data received via the control interface unit or data processed by the data processing device, and a second storage medium for storing configuration data, and
    a communication unit for data transmission with the first external data processing device, wherein
    the configuration data indicate a communication protocol used by the first control device of the first machine tool from a first group of communication protocols and a communication protocol used by the first external data processing device from a second group of communication protocols,
    the control interface unit is adapted to use each of the communication protocols from the first group of communication protocols for data transmission and to select the communication protocol used by the first control device of the first machine tool for data transmission with the first control device of the first machine tool based on the configuration data,
    the communication unit is adapted to use each of the communication protocols from the second group of communication protocols for data transmission and to select the communication protocol used by the first external data processing device for data transmission with the first external data processing device based on the configuration data,
    the control interface unit is adapted to transmit data in parallel with a plurality of connected control devices of respective machine tools including the first control device of the first machine tool,
    the configuration data for each of the connected control devices indicate the communication protocol used by the respective control devices from the first group of communication protocols, and
    the control interface unit is adapted to select the communication protocol used by one control device for data transmission with one of the connected control devices based on the configuration data and to select the communication protocol used by another control device for data transmission with another of the connected control devices based on the configuration data.

2. A data interface device for data transmission between a first numerically controlled machine tool including a first control device for controlling a plurality of actuators of the first machine tool and a first external data processing device, the data interface device comprising:
    a control interface unit for data transmission with the first control device of the first machine tool,
    a data processing device for processing data received at least via the control interface unit,
    a data storage device having a first storage medium for storing data received via the control interface unit or data processed by the data processing device, and a second storage medium for storing data, and
    a communication unit for data transmission with the first external data processing device, wherein
    the configuration data indicate a communication protocol used by the first control device of the first machine tool from a first group of communication protocols and a communication protocol used by the first external data processing device from a second group of communication protocols,
    the control interface unit is adapted to use each of the communication protocols from the first group of communication protocols for data transmission and to select the communication protocol used by the first control device of the first machine tool for data transmission with the first control device of the first machine tool based on the configuration data, the communication unit is adapted to use each of the communication protocols from the second group of communication protocols for data transmission and to select the communication protocol used by the first external data processing device for data transmission with the first external data processing device based on the configuration data, the communication unit is adapted to transmit data in parallel with a plurality of connected external data processing devices including the first external data processing device; and the configuration data for each of the connected external data processing devices indicate the communication protocol used by the respective external data processing device from the second group of communication protocols, and the communication unit is adapted to select the communication protocol used by one connected external data processing device for data transmission with one of the connected external data processing devices based on the configuration data and to select the communication protocol used by another connected external data processing device for data transmission with the other of the connected external data processing devices based on the configuration data.

3. The data interface device according to claim 1, wherein
the configuration data for one or more machine tools including the first machine too, each comprising a plurality of sensors for outputting sensor signals relating to a machine status of a respective machine tool to the control device of the respective machine tool, indicate a respective group of sensors of the respective machine tool or read-out and processing rules for sensor signals of the group of sensors of the respective machine tool;

wherein the data interface device comprises a read-out unit for reading out sensor signal values of the sensor signals of the group of sensors of the one or more of the machine tools indicated in the configuration data via the control interface unit on the basis of the read-out rules indicated in the configuration data; or wherein the data processing device is adapted to process the sensor signal values read by the read-out unit into aggregated sensor data based on the processing rules specified in the configuration data.

4. The data interface device according to claim 1, wherein
the data processing device is adapted to generate data sets of a predetermined data format independent of the communication protocols of the first and second groups on the basis of the data received via the control interface unit, on the basis of the data processed by the data processing device or on the basis of the data stored by the data storage device.

5. The data interface device according to claim 4, wherein
each generated data set comprises identification data which, with regard to the data set generated, indicate an identity of one or more machine tools including the first machine tool, an identity of one or more machine tool components or an identity of one or more sensors.

6. The data interface device according to claim 4, wherein
each generated data set indicates value data and one or more time stamps associated with the value data, and
wherein the value data indicate data values which indicate one or more sensor signal or control signal values, one or more data values calculated from a plurality of signal values or one or more state values indicating a machine status of one or more machine tools.

7. The data interface device according to claim 6, wherein
a data type is specified for each data set or for each value of the value data, wherein the data type indicates whether a corresponding value describes a machine status, a signal value or an operating event in an operation of a corresponding machine tool.

8. The data interface device according to claim 4, wherein
the data processing device is adapted on the basis of signature data stored in the second storage medium to add an electronic signature to a generated data set or to verify signatures added to data sets.

9. The data interface device according to claim 4, wherein
the data processing device is adapted on the basis of encryption data stored in the second storage medium to encrypt a generated data set or, to decrypt encrypted data sets on the basis of the encryption data stored in the second storage medium.

10. The data interface device according to claim 4, wherein
the data processing device is further adapted to add an identification signature to a generated data set.

11. The data interface device according to claim 4, wherein
the communication unit is adapted to generate a data packet including header data and user data for data transmission with the first external data processing device, and
wherein the header data is generated based on the communication protocol used by the first external data processing device, and the user data comprises one or more data sets generated by the first data processing device of the predetermined data format independent of the communication protocols of the first and second groups.

12. The data interface device according to claim 4, wherein
the control interface unit is adapted to generate a data packet containing header data for data transmission with the first control device, and
wherein the header data is generated based on the communication protocol used by the first control device.

13. The data interface device according to claim 4, wherein
the data processing device generates one or more data sets at regular time intervals on the basis of processing rules specified in the configuration data, and sends them to the communication unit with an instruction to transmit the one or more data sets in one or more data packets in accordance with one or more communication protocols of the second group.

14. The data interface device according to claim 13, wherein
the communication unit is adapted to transmit the one or more data sets in one or more data packets according to one or more communication protocols of the second group to a plurality of connected external data processing devices according to a publish subscriber model, wherein the configuration data comprise subscriber identification data indicating one or more of the connected external data processing devices as registered subscribers.

15. The data interface device according to claim 1, wherein
the communication unit comprises a data set output unit connectable directly or via a data network to a control interface unit of another data interface device for transmitting data sets generated by the data processing device to the other data interface device.

16. The data interface device according to claim 1, wherein
the control interface unit comprises a data set receiving unit connectable directly or via a data network to a communication unit of another data interface device for receiving data sets of the other data interface device generated by a data processing device.

17. The data interface device according to claim 1, wherein
the communication unit is adapted to receive configuration instructions from the first external data processing device,
wherein the data processing device is adapted to modify the configuration data stored in the data storage device or to store new configuration data based on the configuration instructions received via the communication unit.

18. The data interface device according to claim 1, wherein
the data storage device has a data interface which is adapted to transmit the data stored in the first storage medium to an externally connected data storage device for data backup or long-term storage in accordance with a synchronous, asynchronous data transmission or data mirroring which is carried out at regular intervals or when a limit value of an amount of data stored in the first storage medium is exceeded.

19. The data interface device according to claim 1, wherein
the external data processing device is connected via a local or global network and comprises an external data server, a web server, an external message broker unit or another data interface device, or is an external data server, a web server, an external message broker unit or another data interface device.

20. A system having one or more data interface devices according to claim 1 and one or more external data processing devices, including the first external data processing device, which are connected via a local or global data network to a communication unit of at least one of the data interface devices, wherein one communication unit of the at least one of the data interface devices is connected via the local or global data network to a control interface unit of another data interface device.

* * * * *